United States Patent
Akahane

(10) Patent No.: US 10,121,271 B2
(45) Date of Patent: Nov. 6, 2018

(54) IMAGE PROCESSING APPARATUS AND IMAGE PROCESSING METHOD

(71) Applicant: CANON KABUSHIKI KAISHA, Tokyo (JP)

(72) Inventor: Takashi Akahane, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 5 days.

(21) Appl. No.: 15/360,685

(22) Filed: Nov. 23, 2016

(65) Prior Publication Data
US 2017/0154454 A1    Jun. 1, 2017

(30) Foreign Application Priority Data

Nov. 30, 2015 (JP) .................. 2015-234313

(51) Int. Cl.
- G06K 9/00 (2006.01)
- G06T 11/60 (2006.01)
- G06T 5/00 (2006.01)

(52) U.S. Cl.
CPC .............. G06T 11/60 (2013.01); G06T 5/003 (2013.01)

(58) Field of Classification Search
None
See application file for complete search history.

(56) References Cited

U.S. PATENT DOCUMENTS

| | | | |
|---|---|---|---|
| 9,854,181 B2* | 12/2017 | Ye ........................ | H04N 5/265 |
| 2003/0235342 A1* | 12/2003 | Gindele ............... | H04N 1/4074 382/260 |
| 2007/0092154 A1* | 4/2007 | Kato .................. | H04N 5/23245 382/254 |
| 2008/0069433 A1* | 3/2008 | Corcoran ............... | G06K 9/40 382/149 |
| 2008/0297648 A1* | 12/2008 | Furuki .................... | G02B 7/38 348/345 |
| 2009/0034837 A1* | 2/2009 | Kato ....................... | H04N 1/60 382/167 |
| 2009/0073287 A1* | 3/2009 | Shimizu ............. | H04N 5/23212 348/234 |
| 2009/0278869 A1* | 11/2009 | Oishi ................... | G09G 3/2025 345/691 |
| 2009/0295783 A1* | 12/2009 | Baba .................... | G09G 3/3406 345/213 |
| 2010/0157135 A1* | 6/2010 | Dossaji .................... | G02B 7/36 348/348 |
| 2011/0001994 A1* | 1/2011 | Matsuda .............. | G03G 15/011 358/1.9 |
| 2011/0273531 A1* | 11/2011 | Ito ........................ | H04N 13/026 348/43 |

(Continued)

FOREIGN PATENT DOCUMENTS

| | | | |
|---|---|---|---|
| JP | 2000156823 A | 6/2000 | |
| JP | 2011180643 A | 9/2011 | |

Primary Examiner — Hadi Akhavannik
(74) Attorney, Agent, or Firm — Canon U.S.A., Inc. IP Division

(57) ABSTRACT

According to various embodiments, an image processing apparatus includes an inputting unit configured to receive input of an image, a range information acquiring unit configured to acquire range information about a subject for each region of the input image, and a converting unit configured to assign a gradation to each region of the input image based on the range information and convert luminance data of the input image according to the assigned gradation.

9 Claims, 11 Drawing Sheets

(56) References Cited

U.S. PATENT DOCUMENTS

| | | | |
|---|---|---|---|
| 2012/0321171 A1* | 12/2012 | Ito | H04N 13/0011 |
| | | | 382/154 |
| 2013/0107002 A1* | 5/2013 | Kikuchi | H04N 5/232 |
| | | | 348/46 |
| 2014/0071235 A1* | 3/2014 | Zhang | H04N 19/597 |
| | | | 348/43 |
| 2015/0117791 A1* | 4/2015 | Mertens | H04N 19/176 |
| | | | 382/239 |

* cited by examiner

IMAGE PROCESSING APPARATUS AND IMAGE PROCESSING METHOD

BACKGROUND

Technical Field

The present invention relates to an image processing technique for providing an effect such as a shadow image to digital image data.

Description of the Related Art

There is an image processing method by which the amount of information of input image data is decreased to emphasize a silhouette of subject. For example, an information processing circuit is proposed to generate a cutout-style image by performing filling based on outlines extracted from input image data (see, for example, Japanese Patent Application Laid-Open No. 2011-180643).

However, a case where two or more subjects overlap each other is not considered in the processing discussed in Japanese Patent Application Laid-Open. No. 2011-180643. Specifically, in a case where outlines extracted from overlapping subjects cross each other, there is a possibility that the subjects cannot be discriminated from each other. This possibility is conspicuous especially in a case where a shadow style image is generated simply by omitting outlines and performing the filling to express the silhouette of a subject.

SUMMARY

According to various embodiments, an image processing apparatus includes an inputting unit configured to receive input of a captured image, an acquiring unit configured to acquire, for each image area of the captured image, range information indicating a distance from an imaging apparatus to a subject at the time of imaging, and a converting unit configured to convert, for each image area of the captured image, a luminance value of the captured image according to the distance to the subject, and convert a color value of the captured image into predetermined value, based on the range information, wherein the converting unit converts the luminance value of the captured image such that the luminance value decreases as the distance to the subject becomes shorter.

Further features will become apparent from the following description of exemplary embodiments with reference to the attached drawings.

DESCRIPTION OF EXEMPLARY EMBODIMENTS

The following describes a first exemplary embodiment of the present invention.

In the present exemplary embodiment, an example will be described in which an exemplary embodiment of the present invention is applied to an image processing apparatus including as imaging system such as a digital camera and a scanner. This is not a limiting example, however, and an exemplary embodiment of the present invention is not limited to the example but is applicable to any image processing apparatus capable of processing image data. Specifically, the image processing apparatus may be an information processing apparatus such as a personal computer, a mobile information terminal, or an image forming apparatus such as a printer. The foregoing also applies to other exemplary embodiments.

Figure 1:
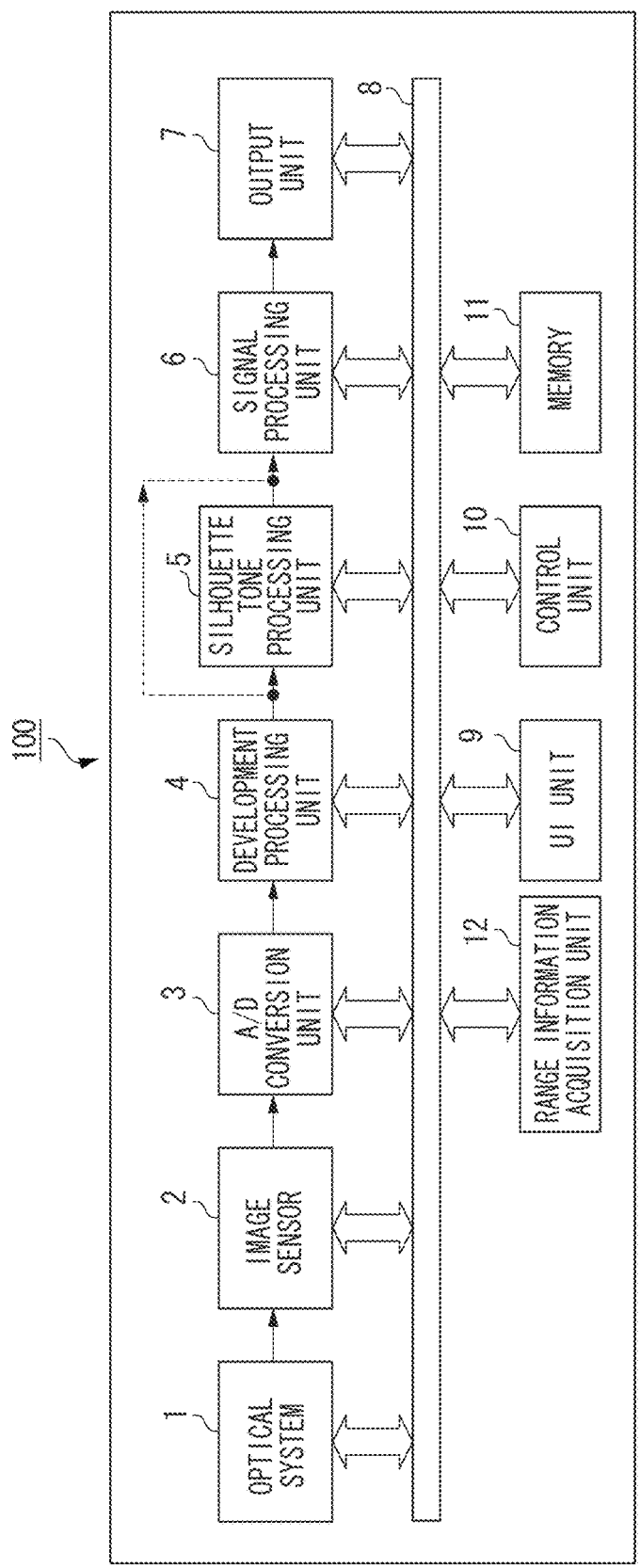
FIG. 1 illustrates the configuration of an image processing apparatus according to a first exemplary embodiment.

FIG. 1 is a block diagram illustrating the configuration of a digital camera that is an image processing apparatus 100 according to a first exemplary embodiment.

In the image processing apparatus 100, light from the subject is focused onto an image sensor 2 by an optical system 1 such as a diaphragm and a lens, and photoelectrically converted into an electric signal, which is output from the image sensor 2. The image sensor 2 is, for example, a single-panel color image sensor including a commonly-used primary color filter. The primary color filter includes three types of color filters having main transmission wavelength bands in the neighborhood of 650 nm, 550 nm, and 450 nm, respectively, and configured to capture images of color planes corresponding to red (R), green (G), and blue (B) bands.

In the single-panel color image sensor, the color filters are spatially arranged in the form of a mosaic for each pixel, and each pixel obtains intensity on a single color plane, so that a color mosaic image is output from the image sensor 2.

An analog/digital (A/D) conversion unit 3 converts the electric signal acquired from the image sensor 2 into a digital image signal and outputs the digital image signal to a development processing unit 4. In the present exemplary embodiment, 12-bit image data is generated for each pixel at this point.

The development processing unit 4 performs a series of development processing such as pixel interpolation processing, luminance signal processing, and color signal processing on the digital image signal output from the A/D conversion unit 3. Through the processing performed by the development processing unit 4, the digital image signal is converted from the RGB color space into the color space of 8-bit luminance (Y) data and chrominance (U, V) data, and output as YUV data from the development processing unit 4.

A range information acquisition unit 12 acquires range information about each pixel of the image data output from the development processing unit 4. The range information in the present exemplary embodiment may be a relative distance from the in-focus position of an image to the subject or an absolute distance from an imaging apparatus to the subject at the time of imaging. The absolute distance or relative distance may be either one of the distance on the image plane side or the distance on the object side. Further, the distance may be represented by the distance in a real space or by the defocusing amount. Further, the range information is not limited to the example in which the distance is set for each pixel of an image, and the distance may be set for each region having a predetermined range of an image.

In the present exemplary embodiment, the range information acquisition unit 12 acquires range information about the subject from the image data output from the development processing unit 4. To acquire the range information, a publicly-known technique may be used such as a method discussed in Japanese Patent Application Laid-Open No. 2000-156823 which uses image plane phase-difference pixels, or a method using a plural pieces of differently blurred image data which are captured under various imaging conditions (Depth From Defocus method (DFD method)).

The range information acquisition unit 12 may acquire the range information without using image data output from the development processing unit 4. For example, the range information acquisition unit 12 may acquire the range information using a phase-difference detection element.

In the present exemplary embodiment, when an imaging mode in which silhouette tone processing is performed on a captured image is set with respect to the image processing apparatus 100, a silhouette tone processing unit 5 performs silhouette tone processing, which will be described below, on image data output from the development processing unit 4.

In the present exemplary embodiment, the image processing apparatus 100 includes the imaging system, and the configuration of the optical system 1 and the image sensor 2 functions as an image input unit to receive input of an image. In a case where an exemplary embodiment of the present invention is applied to an image processing apparatus including no imaging system, an input interface configured to receive input of an image from the outside of the image processing apparatus 100 functions as an image input unit.

A signal processing unit 6 performs resizing processing, etc. on image data having undergone the silhouette tone processing and supplies the image data to an output unit 7. The output unit 7 performs at least one of following steps: outputting to an output interface such as a high-definition multimedia interface (HDMI) (registered trademark), recording on a recording medium such as semiconductor memory card, and outputting to a display apparatus (not illustrated) of the image processing apparatus 100.

In a case where a normal imaging mode in which the silhouette tone processing is not performed on a captured image is set with respect to the image processing apparatus 100, image data output from development processing unit 4 is input directly to the signal processing unit 6 as specified by a broken line in FIG. 1.

A user interface (UI) unit 9 includes one or more input devices such as a switch, a button, and a touch panel provided in the display apparatus (not illustrated). An operation from the outside such as a user instruction is input to the image processing apparatus 100 via the UI unit 9. A control unit 10 performs calculation in response to an operation input via the UI unit 9 and controls each unit of the image processing apparatus 100.

The control unit 10 controls one units via a bus 8 and performs necessary calculation processing as needed.

A memory 11 stores image data for use in the processing units and information data at the time of capturing an image such as an aperture value, shutter speed, International Organization for Standardization (ISO) sensitivity, white balance gain value, and color gamut settings such as standard RGB (s-RGB). The stored data is read and used when needed in response to an instruction from the control unit 10. Further, as illustrated in FIG. 1, the components of the image processing apparatus 100 are connected together such that the components can communicate with each other via the bus 8.

Figure 2:
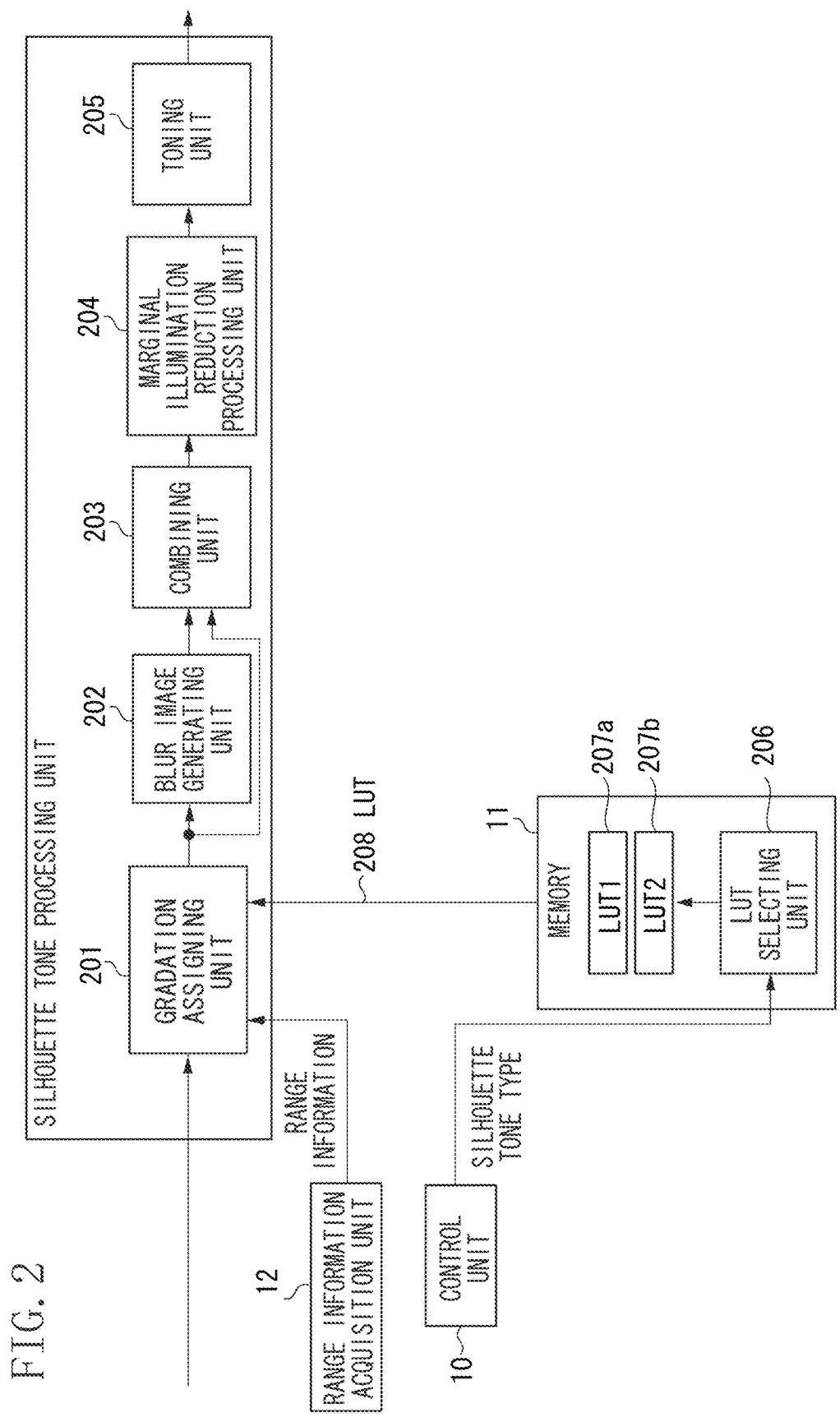
FIG. 2 illustrates the configuration of a silhouette tone processing unit according to the first exemplary embodiment.

The following describes an image processing method, according to one embodiment, in the silhouette tone processing to be executed by the image processing apparatus 100 and the configuration of an image processing circuit that realizes the image processing method, with reference to FIG. 2. The silhouette tone processing unit 5 is configured to apply features of a shadow image as image effects to image data. As used herein, representative features of a shadow image refer to a silhouette expression with the inside of an outline filled with a single solid color, a blurring amount corresponding to the distance from the screen, a peripheral portion where the light is significantly reduced, and number limit of colors.

In the present exemplary embodiment, gradations of luminance (Y) data are determined using the range information corresponding to the captured image, so that even in a case where a main subject overlaps with another subject which is located in front of or behind the main subject existing at an in-focus position, effects of a shadow image expressing silhouettes of the respective subjects can be achieved.

A gradation assigning unit 201 assigns gradations to YUV image data input from the development processing unit 4. As to a gradation assigning method in the present exemplary embodiment, gradations determined based on the range information input from the range information acquisition unit 12 and a one-dimensional lookup table (LUT) 208 are assigned to luminance (Y) data, and a predetermined value (e.g., 0) is uniformly assigned to chrominance (UV) data.

Figure 3A:
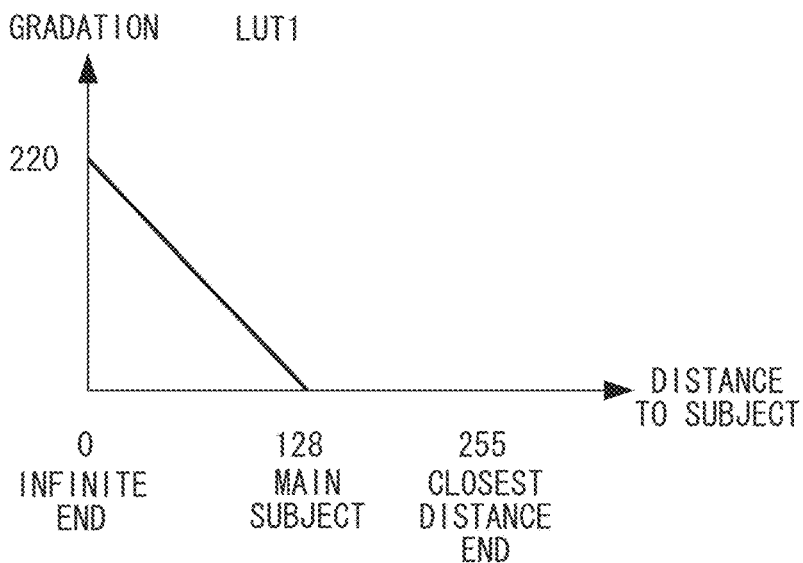
FIGS. 3A and 3B each illustrate input/output characteristics of a lookup table (LUT) for use in gradation assignment according to the first exemplary embodiment.
Figure 3B:
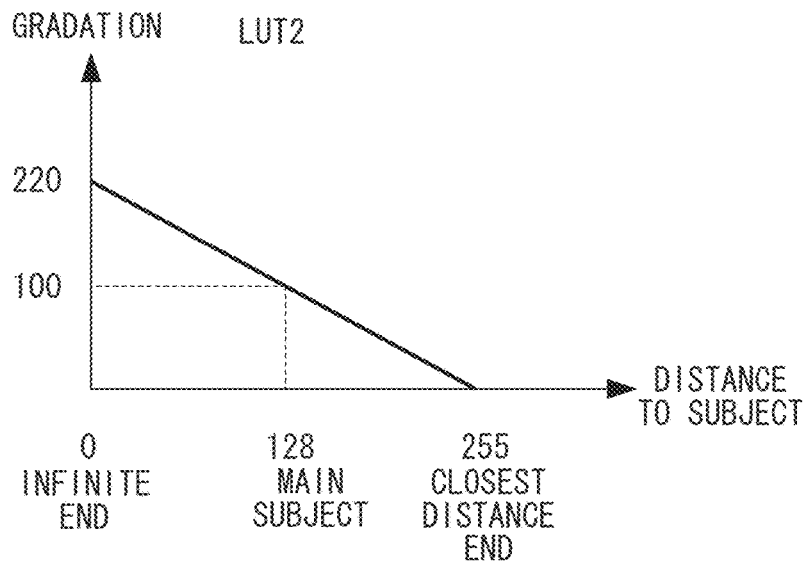

The LUT 208 is a LUT selected by the LUT selecting unit 206 based on the silhouette tone type, from LUTs 207a and 207b provided for each silhouette tone type and having one of the characteristics illustrated in FIGS. 3A and 3B. The silhouette tone types will be described below.

A blur image generating unit 202 generates a blur image by performing blurring processing (smoothing processing) such as filter processing using a low-pass fitter on image data to which the gradations of the silhouette tone are assigned. As used herein, the blur image refers to an image that is blurred compared to the input image, i.e., an image obtained by eliminating higher frequency components than a predetermined frequency from the input image.

There are several possible methods for performing the blurring processing. For example, there is a method in which a low-pass filter using Gaussian filter coefficients is applied vertically and horizontally to an image to smooth the image by a single operation. However, in order to realize a blur level expected in the silhouette tone processing through one smoothing processing, a large kernel size is required of low-pass filter, which leads to a significantly large amount of processing time. In other words, it is not so realistic to perform the processing on hardware of the camera. Thus, in the present exemplary embodiment, a reduction process circuit and an enlargement process circuit are used in combination to generate a blur image in order to shorten the processing time and acquire a desired blur. Details of operations in the blur image generating processing will be described below with reference to a flow chart illustrated in FIG. 6C.

A combining unit 203 combines an image input from the gradation assigning unit 201 with a blur image input from the blur image generating unit 202 under a specific condition. A shadow image can be observed by placing an object between a screen and a light source to produce a shadow and then projecting the shadow of the object onto the screen with the light source. However, the shadow image has such a characteristic that the definition of outlines varies according to the distance between the object and the screen.

To provide the foregoing characteristic to the image data, the image data to which the gradations of the silhouette tone are assigned by the gradation assigning unit 201 expresses a distance to the subject by the gradations, according to the present exemplary embodiment. Thus, the combining unit 203 replaces with a blur image a region having a value equal to or larger than a predetermined value in the image data input from the gradation assigning unit 201, whereby the characteristic of a shadow image that the blur amount varies according to the distance from the screen can be achieved as an image effect.

Further, a marginal illumination reduction unit 204 performs processing on the image data to which the blur effect of the silhouette tone is given as though the marginal illumination of the image data is decreased. In order to generate a distinct shadow, an object to form a shadow and a screen are illuminated by a point light source, so that a shadow image has a characteristic that a single point on the screen has the highest brightness and the brightness decreases as distance from the point becomes larger.

To provide the foregoing characteristic to image data, processing for reducing the marginal luminance of the image data is performed with the center of the screen (image) being the point having the highest brightness in the present exemplary embodiment. Specifically, the image data is multiplied by marginal luminance reduction data (marginal illumination reduction data) of a two-dimensional distribution corresponding to the image data to adjust the luminance distribution of the image. The processing for reducing the marginal luminance of image data is not limited to the foregoing processing. Specifically, to adjust the luminance distribution, the luminance of the data may be reduced by dividing the image data by the luminance reduction data or adding or subtracting the luminance reduction data to or from the image data may be used.

Further, a method is applicable to an exemplary embodiment of the present invention, in which the luminance distribution of image data is adjusted by calculation instead of preparing the marginal luminance reduction data in advance. A light source subject such as the sun can be expressed by placing the point having the highest brightness not in the center of the screen but in an upper or bottom end portion or outside the screen. In this case, marginal coordinates of the illumination reduced data may be vertically and horizontally shifted, and then multiplied by the marginal illumination reduced data.

A toning unit 205 performs toning on image data having undergone the marginal illumination reduction processing. A basic shadow image is a black/white monotone image which is generated by illuminating a colorless screen with light emitted by an incandescent lamp, a light emitting diode (LED) bulb, a projector light source, etc. and recognized as colorless light by human eyes. However, the toning can be performed by inserting a color film in front of the light source to express the sky blue or the sunset red.

To give the foregoing characteristic to the image data, YUV image data input to the toning unit 205 is converted into the RGB space by a matrix calculation, and each RGB plane is multiplied by different coefficients, in the present exemplary embodiment. For example, in order to adjust the color to a color the sky blue, the processing specified by the formulas below may be performed. Naturally, the coefficient may be set to one in a case where no toning is performed.

$R'=R\times 218/255$ $G'=G\times 255/255$ $B'=B\times 191/255$

The toning unit 205 re-converts the color-adjusted RGB image data into the YUV format by a matrix calculation and outputs the data as YUV image data to the signal processing unit 6.

The setting of the luminance value (Y) by the gradation assigning unit 201 and the setting of the color value (UV) by the toning unit 205 are separately performed to enable conversion into a monotone image showing the distance of the region in a single-color gray scale, for each region of the image.

The following describes in more detail the gradation assigning processing performed by the gradation assigning unit 201 in the present exemplary embodiment.

The gradation assigning unit 201 assigns the gradations of the image data according to the range information input from the range information acquisition unit 12, but the range information cannot be used direct as the gradations of the image data because various forms of range information are conceivable as described above. Thus, LUTs respectively corresponding to the forms of range information to be used are stored in advance on the memory 11, and a result of applying the LUT to the range information is assigned as the gradations of the image data.

In the present exemplary embodiment, the range information is used that expresses the distance to the subject from each pixel image data in 256 gradations, where 0, 128, and 255 are an infinite end, a focal plane, and a close end, respectively.

FIG. 3A is the LUT 207a for converting the range information into the gradations of the silhouette tone. A shadow image has distinctive gradation characteristics that all major subjects are shadows, a background is slightly bright in contrast to the shadows, and a region where no subject exists is the screen to project the shadow image and thus has the highest brightness. A background portion in a shadow image is brighter than a shadow because an object to form the shadow is located away from the screen and close to a light source to allow light from the light source to come around the object.

To give gradations close to a shadow image to the image data, the LUT 207a uniformly gives a gradation value of 0 to an input value of 128 or greater, i.e., a subject existing between the main subject at the focal plane and the closest distance end, whereby the subject is expressed as a shadow. Next, an input value of 0, i.e., a subject located between the infinite end and an input value of 128, is given a linearly-interpolated gradation value between 220 and 0 based on the input value, whereby the subject is expressed as a background and a screen.

FIGS. 4A to 4F illustrate images (data) having undergone the steps in the silhouette tone processing performed by the silhouette tone processing unit 5 in the present exemplary embodiment.

Figure 4A:
FIGS. 4A to 4F illustrate images having undergone respective steps in the silhouette tone processing according to the first exemplary embodiment.
Figure 5:
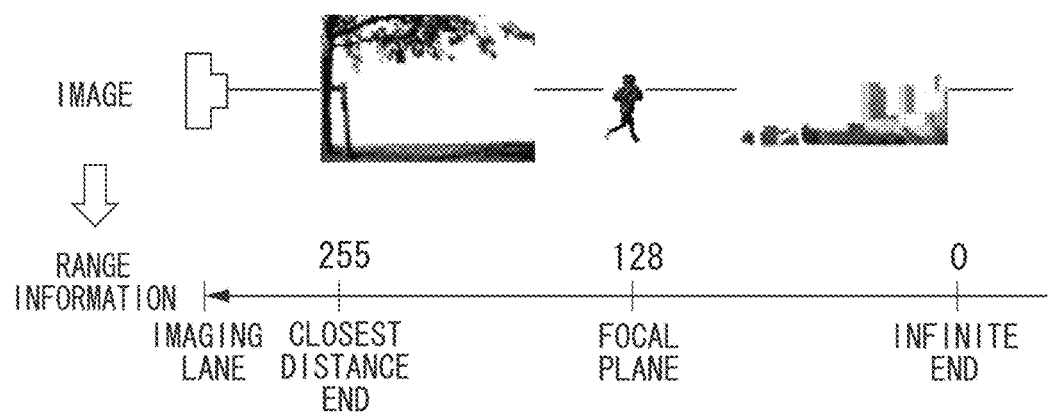
FIG. 5 schematically illustrates the distance relationship between each subject according to the first exemplary embodiment.

FIG. 4A illustrates a sample of image data containing YUV data output from the development processing unit 4 and input to the silhouette tone processing unit 5. FIG. 5 schematically illustrates the distance relationship between the subjects in the image data. In the image data, a person that is the main subject exists in the center of the screen at the focal plane, and a tree trunk standing on the left hand side of the screen exists at the closest distance end, as illustrated in FIGS. 4A and 5. Further, buildings and a forest exist more distant than the focal plane, and the sky exists at the infinite end, as illustrated in FIGS. 4A and 5.

Figure 4B:

FIG. 4B illustrates an image of the range information output from the range information acquisition unit 12 and input to the silhouette tone processing unit 5. In FIG. 4B, the value of the sky existing at the infinite end is zero, and the value of the buildings and the forest existing more distant than the focal plane is 64. The value of the person existing at the focal plane is 128, and the value of the tree trunk existing at the closest distance end is 255. A ground existing between the person and the tree changes continuously between 128 and 255.

Figure 4C:

FIG. 4C illustrates an image of the image data output from the gradation assigning unit 201. In FIG. 4C, as a result of the gradation assigning processing described above, the value of the person existing at the focal plane and the values of the tree, the ground, etc. located closer to the closest distance end than to the focal plane and having a large value of range information are uniformly zero, and the person, the tree, the ground, etc. are represented as shadows to emphasize the silhouettes. On the other hand, the values of the buildings and the forest located closer to the infinite end than to the focal plane and having a smaller value of range information are uniformly 200, whereby the buildings and the forest are discriminable from the shadow regions while the silhouettes of the buildings and the forest are emphasized. Further, the value of the sky existing at the infinite end uniformly 220, and the sky has the highest brightness in the screen and is expressed as a screen in the shadow image.

Figure 4D:

FIG. 4D illustrates an image of the image data output from the combining unit 203. In the present exemplary embodiment, a region of the image output from the gradation assigning unit 201 that has a value of 200 or greater, i.e., background region, is replaced with the blur image output from the blur image generating unit 202. From FIG. 4D it can be recognized that while the sharpness of the outlines of the buildings and the forest decreases, the high sharpness of the outlines of the shadows is maintained, whereby the silhouettes of the shadows are more emphasized.

Figure 4E:

FIG. 4E illustrates an image of the image data output from the marginal illumination reduction unit 204. In the present exemplary embodiment, the marginal illumination reduction processing is performed by multiplying the image data output from the blur image generating unit 202 by the marginal luminance reduction data for concentrically reducing the input values in such a way that the center of the screen is reduced by 100% of the input value, each of the four corners of the screen is reduced by 30% of the input value, and other regions are reduced by predetermined percentages of the input values. From FIG. 4E it can be recognized that the reduction in the marginal illumination is expressed as though the screen is illuminated by a point light source.

As described above, in a final image acquired as a result of execution of the gradation assigning processing using the characteristic specified in the LUT 207a in FIG. 3A, the gradation value of the main subject existing at the focal plane is set to zero which surely expresses the main subject as a shadow, so the expression is similar to the actual shadow image. However, since the gradation value of a subject closer to the imaging plane than to the main subject is also set to 0, in a case where, for example, the person in FIG. 4E moves to overlap with the tree trunk, the silhouettes of the person and the tree trunk is not discriminable. Thus, control may be selectively performed to separate the gradations of the main subject and the subject closer to the imaging plane than to the main subject according to the user's drawing plan. Accordingly, in the present exemplary embodiment, an appropriate LUT can be selected and applied according to the user's drawing plan, which will be described later.

Figure 6:
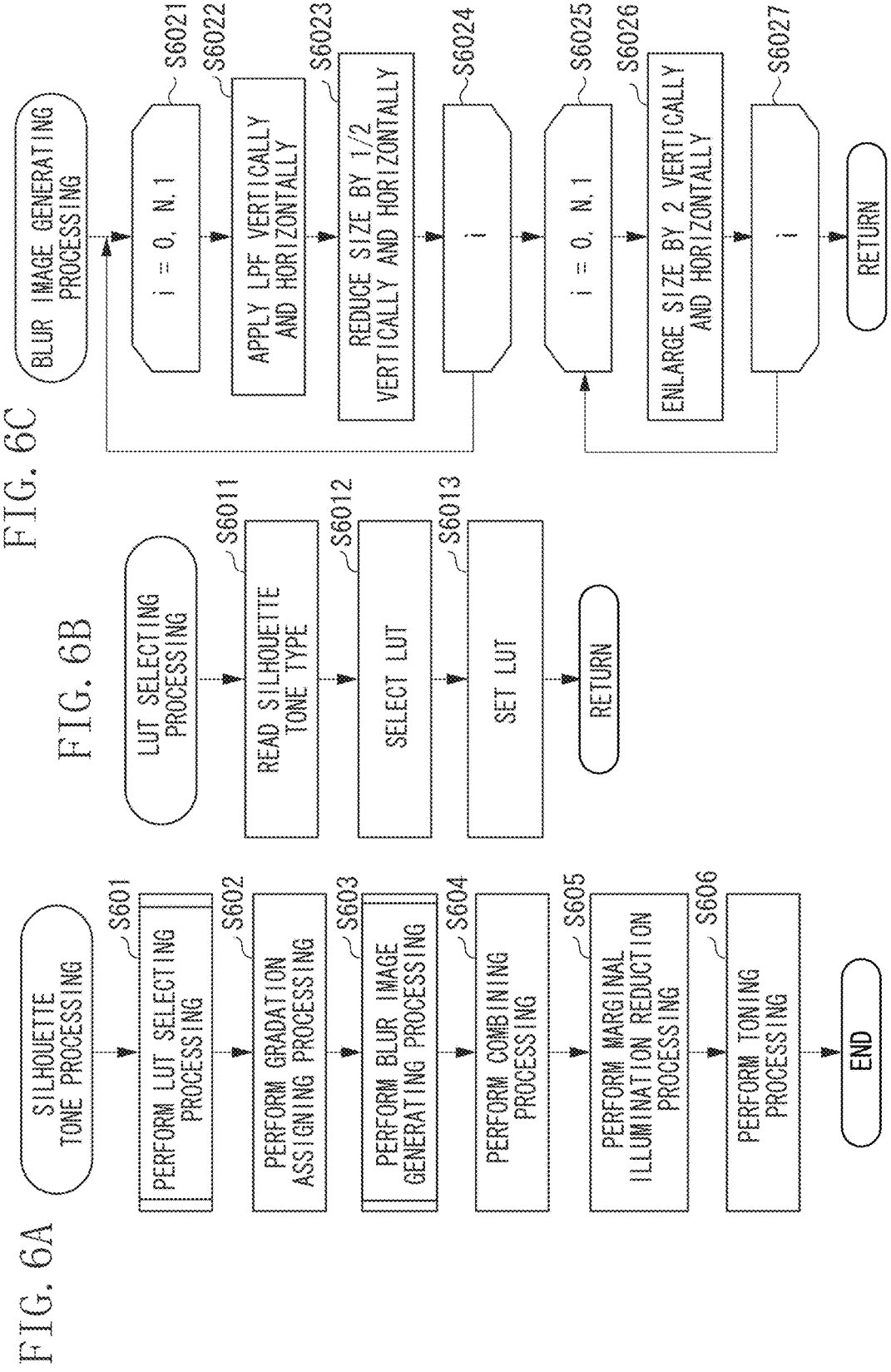
FIGS. 6A to 6C are flow charts illustrating operations in silhouette tone processing according to the first exemplary embodiment.

FIG. 6 is a flow chart illustrating entire operations in the silhouette tone processing performed by the silhouette tone processing unit 5 illustrated in FIG. 2. Each operation in the flow chart is performed by the control unit 10 or by in each unit according to an instruction from the control unit 10.

In step S601, the LUT selecting unit 206 selects and sets the LUT 208 used by the gradation assigning unit 201.

In step S602, the gradation assigning unit 201 performs gradation assigning processing as described above according to the selected LUT 208.

In step S603, the blur image generating unit 202 performs blur image generating processing on the image data to which the gradations are assigned.

In step S604, the combining unit 203 performs combining processing as described above on the blur image output from the blur image generating unit 202 and the image data output from the gradation assigning unit 201.

In step S605, the marginal illumination reduction unit 204 performs marginal illumination reduction processing as described above on the image data having undergone the combining processing.

Alternatively, only one of the blurring processing in step S604 and the marginal illumination reduction processing in step S605 may be applied to the captured image having undergone the gradation conversion. Even when only one of them is applied, more effect of the silhouette tone can still be provided.

In step S606, the toning unit 205 performs toning processing as described above on the image data having undergone the marginal illumination reduction processing, and the image data is output from the silhouette tone processing unit 5. Then, the processing is ended.

The following describes in detail the LUT selecting processing in step S601 in FIG. 6, with reference to the flow chart illustrated in FIG. 6B. As described above, in the present exemplary embodiment, an appropriate LUT is selected and applied according to the user's drawing plan. For example, in a case where the user's drawing plan is to reliably determine the silhouette of the main subject existing at the focal plane, the gradation assigning processing is performed using a LUT 2 having the characteristic that the gradation value of the closest distance end takes a gradation value of zero and the main subject takes a gradation value higher than zero, as illustrated in FIG. 3B. On the other hand, in a case where the user's drawing plan is to express the main subject as a silhouette as in a shadow image, the gradation assigning processing is performed using a LUT 1 having the characteristic that a gradation value of 0 is uniformly given to a subject existing between the main subject at the focal plane and the closest distance end, as illustrated in FIG. 3A. The LUTs 1 and 2 both have the characteristic that a gradation value of 220 is given to a subject existing at the infinite end to represent the subject as a screen. Further, a gradation value which is linearly interpolated between the infinite end and the main subject based on the distance is given to a subject existing between the infinite end and the main subject to represent the subject as a background.

The gradation values set in the LUTs 1 and 2 illustrated in FIGS. 3A and 3B are mere examples, and the gradation values are not limited to the gradation values specified in the LUTs 1 and 2.

Figure 4F:

FIG. 4E illustrates the output image from the silhouette tone processing unit 5 in the case where the LUT 1 is used as the LUT 208 used by the gradation assigning unit 201 as described above. On the other hand, FIG. 4F illustrates an output image in the case where the LUT 2 is used as the LUT 208. In FIG. 4F, while the tree trunk is expressed as a shadow, the person is expressed in halftones, so the silhouettes of the tree and the person are clearly discriminable from each other.

In the present exemplary embodiment, prior to the generation of an image in silhouette tone, the user can select, as a silhouette tone type, whether to prioritize a shadow image style or the determination of silhouette. A silhouette tone type input by the user via the UI unit 9 is recorded on the memory 11.

In step S6011, the control unit 10 reads from the memory 11, for example, the silhouette tone type that prioritizes a shadow image style.

Next, in step S6012, the LUT selecting unit 206 determines the read silhouette tone type and selects the corresponding LUT 208 from the LUTs 207 stored on the memory 11 for each silhouette tone types. In the case of the silhouette tone type that prioritizes the shadow image style, the LUT 1 is selected. In the case of the silhouette tone type that prioritizes the determination of silhouette, the LUT 2 is selected. The LUTs 207 for the respective silhouette tone types are stored in advance to avoid a huge amount of calculation processing at the time of the imaging, whereby high-speed continuous imaging can be performed without decreasing the imaging frame rate.

In step S6013, the control unit 10 sets the selected LUT 208 to the gradation assigning unit 201, and the processing returns to the main processing.

The following describes in detail the blur image generating processing in step S603 in FIG. 6, with reference to the flow chart in FIG. 6C. As described above, in the blur image generating processing, a blur image is generated by combining the reduction processing and the enlargement processing. More specifically, the reduction processing is performed on image data which has undergone the gradation assigning processing to reduce the amount of information, and then the enlargement processing is performed together with interpolation to give the image a blur effect.

First, the reduction size of a most-reduced image is set according to the target blur size. For example, in the present exemplary embodiment, the size of each side of a blur image which replaces an infinite end region is one-fourth the size of each side of an input image (the number of pixels is one-fourth in the vertical direction and in the horizontal direction). In steps S6021 to 6024, in a case of reducing the size of each side by one-fourth, the reduction by one-half is vertically and horizontally repeated N times (in this case N=2). At this time, in step S6022, a low-pass filter (LPF) having filter coefficients of [1, 2, 1] is applied vertically and horizontally to perform smoothing prior to the reduction in order to prevent an occurrence of folding of high-frequency components, i.e., an occurrence of so-called moiré, that is caused by the reduction. When the reduction processing is repeated N times and completed, then in steps S6025 to S6027, the enlargement processing is performed until the size is enlarged to the original size. As in the reduction processing, the enlargement processing is repeated doubly N times vertically and horizontally.

While the zoom ratio in the reduction is set to one-half in one processing according to the present exemplary embodiment, the zoom ratio may be one-quarter or is not limited to these. However, the filter coefficients of the low-pass filter to be applied need to be changed as appropriate to prevent an occurrence of moiré. For example, in the case where the zoom ratio is set to one-quarter, the filter coefficients need to be set to [1, 4, 6, 4, 1].

As the foregoing describes, in the present exemplary embodiment, an image in silhouette tone is generated by generating luminance data having gradations of silhouette tone using range information corresponding to the input image, and then combining the luminance data with black/white monotone data or color data having undergone toning to acquire final image data, in the silhouette tone processing for providing the effect of the silhouette tone. In this way, even if the subjects overlap one above the other with each other, the silhouette tone processing for expressing the silhouettes of the respective subjects can be realized.

Further, in the present exemplary embodiment, the gradation assigning processing is performed as appropriate according to the silhouette tone type, so that an image in silhouette tone reflecting the user's drawing plan can be generated.

The following describes a second exemplary embodiment. As described above, in the silhouette, the brightness of a formed shadow varies according to the distance between an object forming the shadow and the light source. In a case where a plurality of objects is placed at different distances from the light source to generate a shadow image, a plurality of shadows different in brightness is generated, and the brightness of the shadows of each object has a characteristic that the brightness is discrete according to the distance from the light source.

While the LUT having a characteristic that continuous gradations are assigned based on the range information is used in the gradation assigning processing performed by the gradation assigning unit 201 in the first exemplary embodiment, the characteristics of LUTs stored as preset LUTs are discretized to calculate a gradation assignment LUT at the time of the gradation assigning processing performed by the gradation assigning unit 201 in the second exemplary embodiment.

Figure 7:
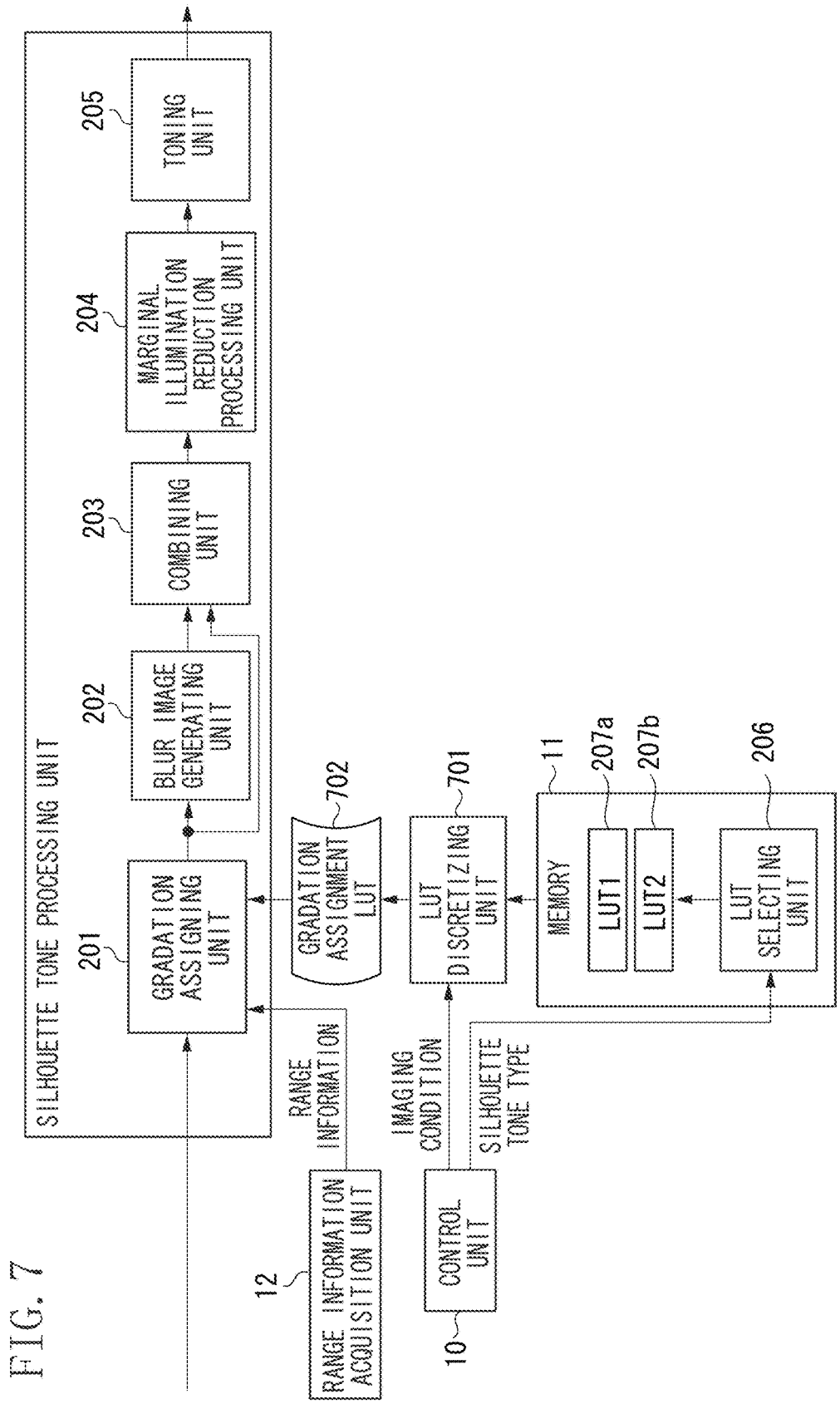
FIG. 7 illustrates the configuration of a silhouette tone processing unit according to a second exemplary embodiment.

FIG. 7 is a block diagram illustrating details of the silhouette tone processing unit 5 according to the second exemplary embodiment. Processing performed by a block having the same reference numeral as in FIG. 2 are similar to that in FIG. 2, therefore, its description is omitted. A difference from the first exemplary embodiment is that a LUT discretizing unit 701 is included to analyze imaging conditions received from the control unit 10 and calculate an appropriate gradation assignment LUT 702 corresponding to the imaging conditions.

FIG. 8 is a flow chart illustrating an example of operations in the LUT selecting processing in step S601 in FIG. 6A according to the present exemplary embodiment. The rest of the silhouette tone processing is similar to the operations illustrated in FIG. 6.

In step S801, the control unit 10 reads as the silhouette tone type one of the modes of prioritizing a shadow image style and determining the silhouette. In the description below, the mode in which the silhouette determination is prioritized is read from the memory 11, as an example.

In step S802, the LUT selecting unit 206 determines the read silhouette tone type and selects a corresponding LUT 208 from the LUTs 207 for each silhouette tone type stored in the memory 11. In the case where the silhouette determination is prioritized, the LUT 2 is selected.

In step S803, the LUT discretizing unit 701 performs discretizing processing on the selected LUT to calculate the gradation assignment LUT 702.

In step S804, the control unit 10 sets the discretized gradation assignment LUT 702 to the gradation assigning unit 201, and the processing returns to the main processing.

Figure 9:
FIG. 9 illustrates an image having undergone silhouette tone processing according to the second exemplary embodiment.

FIG. 9 illustrates an image having undergone the silhouette tone processing which is performed by the silhouette tone processing unit 5 according to the present exemplary embodiment. In a comparison between FIGS. 4F and 9, while the gradation of the ground changes continuously from the base of the tree to the feet of the person in FIG. 4F, a gradation value of 100 is uniformly assigned to the person and the ground near the person and a gradation value of zero is uniformly assigned to the tree at the closest distance end and the ground near the tree in FIG. 9. The gradation is discretized according to the distance so that the characteristic of the shadow image described above is expressed more appropriately.

Figure 8A:
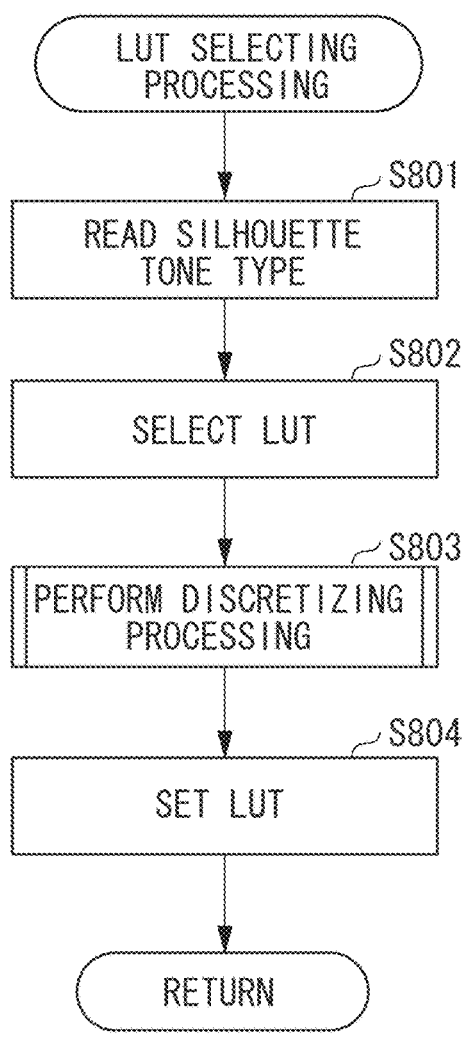
FIGS. 8A and 8B are flow charts illustrating operations in LUT selecting processing according to the second exemplary embodiment.
Figure 8B:
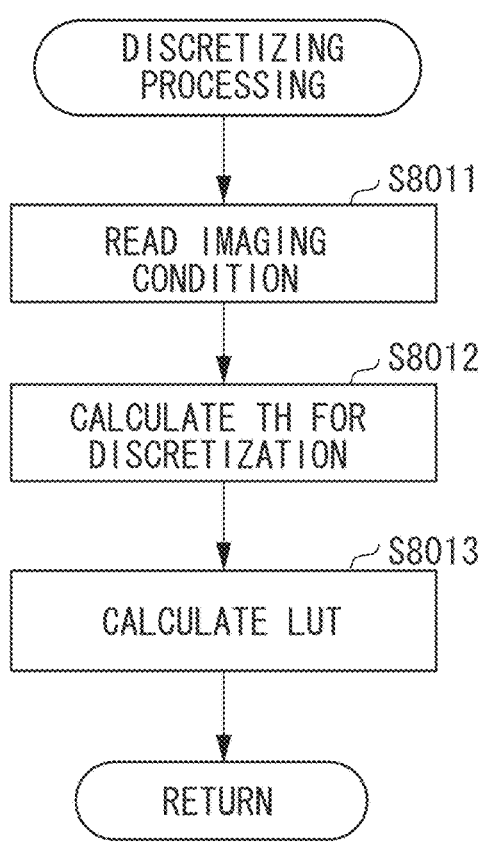

The following describes in detail the LUT discretizing processing in step S803 in FIG. 8A, with reference to the flow chart in FIG. 8B.

Figure 10:
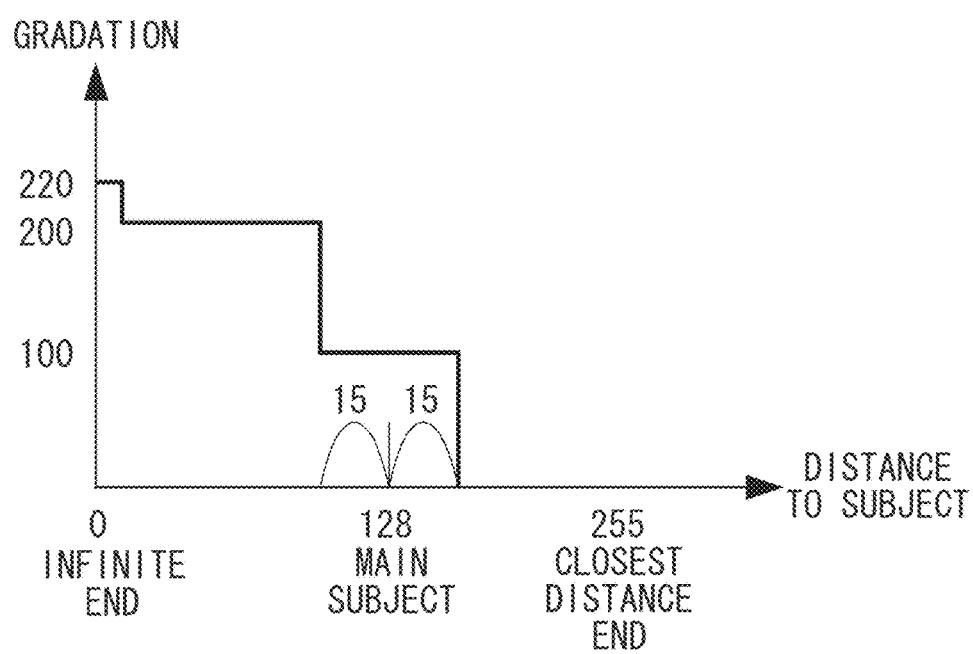
FIG. 10 illustrates input/output characteristics of a LUT for use in gradation assignment according to the second exemplary embodiment.

According to the present exemplary embodiment, the LUT 207 converts range information into gradations of silhouette tone. The LUT discretizing unit 701 divides the LUT 207 into four regions that are a main subject existing near the focal plane, a subject at close range, a background subject, and a subject at the infinite end. The same gradation value is given to a region having a predetermined distance range, whereby the range information is discretized into four gradations. FIG. 10 illustrates the gradation assignment LUT 702 calculated by discretizing the LUT 207b. The LUT 207b is chosen in the case of the silhouette tone type that prioritizes the silhouette determination.

A threshold value for determining that a subject is close to the in-focus position at a predetermined distance or much closer will be denoted by TH_close, whereas a threshold value for determining that a subject is far from the in-focus position at a predetermined distance or much farther will be denoted by TH_far. The gradation assignment LUT 702 has the following characteristics. A gradation value of 100 representing a main subject is given to 128 representing the focal plane, the input within a range between 128−TH_far and 128+TH_close being a main subject region. A gradation value of zero representing a shadow is given, the input greater than 128+TH_close being a closest subject. As to the input smaller than 128−TH_far, a gradation value of 220 representing a screen is given, the input in the neighborhood of zero being a subject at the infinite end, and a gradation value of 200 representing a background is given, other input being a background subject. Specifically, a gradation value is assigned to each region depending on where the distance of the region is included, in a plurality of distance ranges set stepwise based on the distance from the focal plane.

In this case, the value of the range information that is input from the gradation assignment LUT 702 varies depending on the imaging condition at the time of capturing an input image that is a target of the silhouette tone processing. Thus, in the present exemplary embodiment, as described below, the threshold value for the LUT discretization is adaptively controlled according to the imaging condition. Specifically, the plurality of distance ranges described above is set based on the imaging condition of the input image.

In the present exemplary embodiment, the control unit 10 can acquire from the optical system 1 the shortest possible imaging distance. Further, the distance of the focal plane can be acquired from the range information acquisition unit 12.

In step S8011, the control unit 10 reads from the memory 11, for example, the shortest possible imaging distance of 1 m and the distance of the focal plane of 11 m as the imaging conditions. In the present exemplary embodiment, an image processing apparatus including an imaging system is used, so the imaging conditions set at the time of capturing the input image are stored on the memory 11, and the foregoing processing is realized by reading the stored imaging conditions.

In step S8012, the LUT discretizing unit 701 calculates a threshold value necessary for the LUT discretization based on the imaging conditions. In the present exemplary embodiment, for example, the LUT discretization is performed using a subject existing in front of or behind the focal plane within 1 m from the focal plane as a main subject.

Figure 11A:
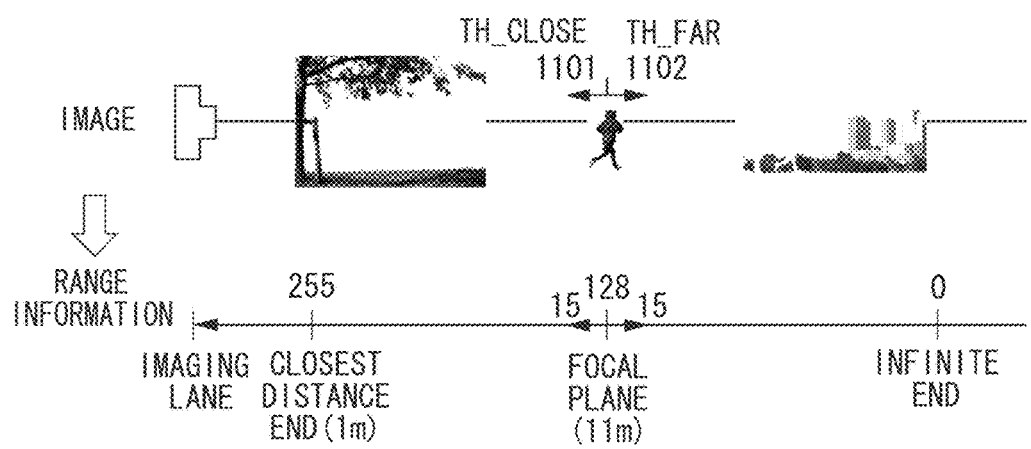
FIGS. 11A and 11B schematically illustrate the distance relationship between each subject according to the second exemplary embodiment.

FIG. 11A schematically illustrates the distance relationship between the subjects in the case where the shortest possible imaging distance of 1 m and the distance of the focal plane of 11 m are set as the as imaging conditions. In FIG. 11A, TH_close 1101 and TH_far 1102 for the LUT discretization are both, for example, 15.

Figure 11B:
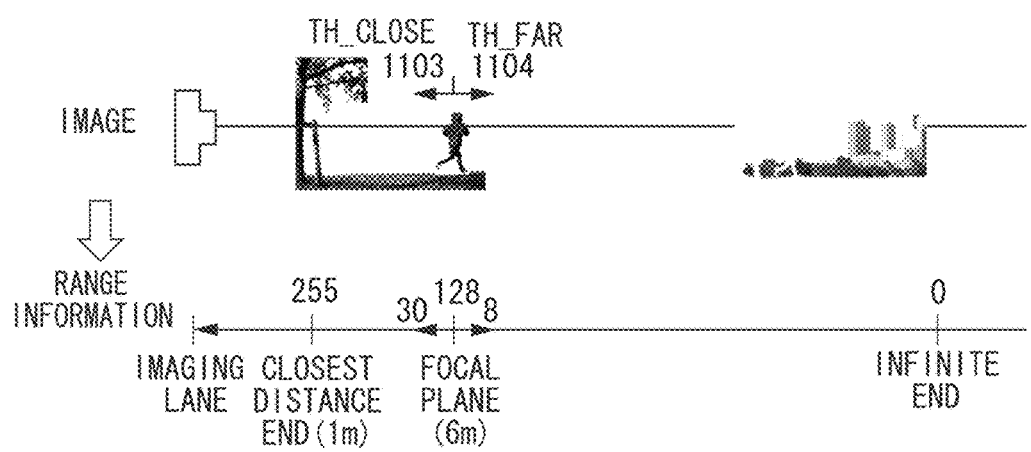

FIG. 11B schematically illustrates the distance relationship between the subjects in a case where the shortest possible imaging distance of 1 m and the distance of the focal plane of 6 m are set as the imaging conditions. Since the distance of the focal plane is shortened to 6 m, the value of range information for representing the same distance becomes relatively large in a region closer to the imaging plane than to the focal plane. Thus, the threshold value for the discretization needs to be increased in front of or behind the focal plane within 1 m from the focal plane, so that TH_close 1103 under the imaging conditions in FIG. 11B is, for example, 30. On the other hand, the value of range information for representing the same distance becomes relatively small in a region more distant from the imaging plane than the focal plane. Thus, the threshold value for the discretization needs to be decreased in front of or behind the focal plane within 1 m from the focal plane, so that TH_far 1104 under the imaging conditions in FIG. 11B becomes, for example, eight.

While the shortest possible imaging distance of the optical system 1 and the distance of the focal plane are described as examples of the imaging conditions in the present exemplary embodiment, the imaging conditions are not limited to the described examples. For example, the focal length or the aperture value may be used as the imaging conditions. When the focal length or the aperture value is changed, the maximum distance within which range information can be acquired, i.e., the distance of the infinite end, changes, so that the value of range information for representing the same distance relatively changes in a region more distant from the imaging plane than from the focal plane. For example, if the distance of the infinite end is increased, TH_far can be decreased. On the other hand, if the distance of the infinite end is decreased, TH_far can be increased.

Further, the threshold values may be set by combining elements cited as examples of the imaging conditions to determine the discretized distance range.

In step S8013, the LUT discretizing unit 701 performs LUT discretizing processing as described above using the threshold values calculated in step S8012 to discretize the LUT 207 and calculates the gradation assignment LUT 702, and the processing returns to the main processing.

As described above, in the present exemplary embodiment, an image in silhouette tone is generated by generating luminance data having gradations of silhouette tone using range information corresponding to the input image and then combining the luminance data with black/white monotone data or color data having undergone toning to acquire final image data in the silhouette tone processing for giving the effect of the silhouette tone. In this way, even if a subject overlaps with another subject one above the other, the silhouette tone processing for expressing the silhouettes of the respective subjects can be realized.

Further, in the present exemplary embodiment, the LUT is discretized using the threshold values appropriate for the imaging conditions, and the gradation assigning processing is performed using the discretized LUT, whereby the taste of the silhouette tone can be expressed to a maximum extent.

While the hardware configurations of the respective blocks of the silhouette tone process unit 5 are described in the above exemplary embodiments, each operation of the respective blocks can be realized by software, so that a part or all of the operations of the silhouette tone processing unit 5 may be implemented as software processing. Similarly, a part or all of the other blocks of the image processing apparatus 100 in FIG. 1 may be implemented as software processing.

The gradation assigning unit 201 performs gradation assigning processing using the one-dimensional LUT has been described as an example in each of the exemplary embodiments described above. The method for the gradation assigning processing is not limited to the methods described above, and any method may be used as long as the gradation assigning processing is performed with the characteristics illustrated in FIG. 3A, 3B, or 10, such as calculating an output pixel value by calculation.

Other Exemplary Embodiment

An exemplary embodiment of the present invention may be realized by supplying a program for realizing one or more functions of the above-described exemplary embodiments to a system or apparatus via a network or storage medium and causing one or more processors of a computer of the system or apparatus to read and execute the program. Further, an exemplary embodiment of the present invention may be realized by a circuit (e.g., application specific integrated circuit (ASIC)) that realizes one or more functions.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-234313, filed Nov. 30, 2015, which is hereby incorporated by reference herein in its entirety.

What is claimed is:

1. An image processing apparatus comprising:
at least one processor or circuit;
a memory,
wherein the at least one processor or circuit is configured to function as following units using data in the memory:
an inputting unit configured to receive input of a captured image;
an acquiring unit configured to acquire, for each image area of the captured image, range information indicating a distance from an imaging apparatus to a subject at the time of imaging; and
a converting unit configured to convert, for each image area of the captured image, a luminance value of the captured image according to the distance to the subject, and convert a color value of the captured image into a predetermined value, based on the range information,
wherein the converting unit converts the luminance value of the captured image such that the luminance value decreases as the distance to the subject becomes shorter, and
wherein the converting unit assigns an equal luminance value to an image area included in a predetermined distance range.

2. An image processing apparatus comprising:
at least one processor or circuit;
a memory,
wherein the at least one processor or circuit is configured to function as following units using data in the memory:
an inputting unit configured to receive input of a captured image;
an acquiring unit configured to acquire, for each image area of the captured image, range information indicating a distance from an imaging apparatus to a subject at the time of imaging; and
a converting unit configured to convert, for each image area of the captured image, the captured image into a shadow image of the subject expressed in light and dark according to the distance to the subject, based on the range information,
wherein the converting unit converts the captured image such that darkness increases as the distance to the subject becomes shorter, and
wherein the converting unit converts the captured image in an image area included in a predetermined distance range to equal darkness.

3. The image processing apparatus according to claim 1, wherein the converting unit assigns the luminance value to an image area depending on where a distance of the image area is included, in a plurality of distance ranges set stepwise based on a distance from a focal plane at the time of the imaging.

4. The image processing apparatus according to claim 1, wherein the converting unit converts the luminance value such that a luminance value of zero is uniformly assigned to a subject located closer than a focal plane at the time of the imaging.

5. The image processing apparatus according to claim 1, further comprising a blurring processing unit configured to perform blurring processing on the captured image converted by the converting unit in a blur amount that differs according to the distance to the subject, for each image area.

6. The image processing apparatus according to claim 1, further comprising a marginal illumination reduction processing unit configured to perform marginal illumination reduction processing on the captured image converted by the converting unit to reduce an amount of light in a marginal area of the captured image.

7. The image processing apparatus according to claim 3, wherein the plurality of distance ranges is set according to an imaging condition at the time of the imaging.

8. The image processing apparatus according to claim 7, wherein the imaging condition includes at least one of a distance to the focal plane, a distance at which imaging is performable, a focal length, and an aperture value.

9. An image processing method comprising:
receiving input of a captured image;
acquiring, for each image area of the captured image, range information indicating a distance from an imaging apparatus to a subject at the time of imaging; and
converting, for each image area of the captured image, a luminance value of the captured image according to the distance to the subject, and converting a color value of the captured image into a predetermined value, based on the range information,
wherein the converting converts the luminance value of the captured image such that the luminance value decreases as the distance to the subject becomes shorter, and
wherein the converting unit assigns an equal luminance value to an image area included in a predetermined distance range.

* * * * *